(12) United States Patent
Li et al.

(10) Patent No.: US 10,284,045 B2
(45) Date of Patent: May 7, 2019

(54) ELECTRIC MOTOR HAVING REINFORCING RING

(71) Applicant: JOHNSON ELECTRIC INTERNATIONAL AG, Murten (CH)

(72) Inventors: Yue Li, Hong Kong (CN); Mao Xiong Jiang, Shen Zhen (CN); Jian Zhao, Shen Zhen (CN); Yong Wang, Shen Zhen (CN); Yong Li, Shen Zhen (CN); Yan Fei Liao, Shen Zhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 428 days.

(21) Appl. No.: 15/010,461

(22) Filed: Jan. 29, 2016

(65) Prior Publication Data

US 2016/0226320 A1  Aug. 4, 2016

(30) Foreign Application Priority Data

Jan. 30, 2015 (CN) .......................... 2015 1 0054879
Nov. 3, 2015 (CN) .......................... 2015 1 0738046

(51) Int. Cl.
*H02K 3/52* (2006.01)
*H02K 1/18* (2006.01)

(52) U.S. Cl.
CPC ............. *H02K 3/522* (2013.01); *H02K 1/187* (2013.01)

(58) Field of Classification Search
CPC ............ H02K 1/04; H02K 3/30; H02K 3/325; H02K 3/34; H02K 3/345; H02K 1/2786; H02K 1/187

USPC .................. 310/67 R, 90, 194, 214, 215
See application file for complete search history.

(56) References Cited

U.S. PATENT DOCUMENTS

| | | | | |
|---|---|---|---|---|
| 5,610,462 A * | 3/1997 | Takahashi | ............ | H02K 5/1675 310/90 |
| 6,300,695 B1 * | 10/2001 | Neal | .................... | H02K 5/1735 310/64 |
| 2003/0155838 A1 * | 8/2003 | Horng | ...................... | H02K 3/28 310/194 |
| 2003/0160530 A1 * | 8/2003 | Horng | ................... | H02K 1/187 310/91 |
| 2007/0241643 A1 * | 10/2007 | Watanabe | ............. | F04D 25/082 310/67 R |

(Continued)

OTHER PUBLICATIONS

"integral, adj. and n." OED Online. Oxford University Press, Jul. 2018. Web. Oct. 2, 2018. (Year: 2018).*

*Primary Examiner* — Thomas Truong
(74) *Attorney, Agent, or Firm* — Muncy, Geissler, Olds & Lowe, P.C.

(57) ABSTRACT

An electric motor has stator with a core of magnetic material, a winding frame covering the core and windings wound around the winding frame. The core has an annular yoke and a plurality of teeth that extend radially outwardly from the yoke. The winding frame is an overmolded structure and has an insulation part that covers the core, a supporting part disposed inward of the insulation part and a plurality of ribs that connect the insulation part and the supporting part. A reinforcing ring is embedded in the supporting part. The strength of the reinforcing ring is higher than the strength of the winding frame. Thus material utilization is improved and the weight of the stator is reduced while ensuring the strength of the supporting part.

16 Claims, 6 Drawing Sheets

(56) References Cited

U.S. PATENT DOCUMENTS

| | | | | |
|---|---|---|---|---|
| 2011/0175485 A1* | 7/2011 | Naganawa | ............ | H02K 1/146 310/214 |
| 2013/0121829 A1* | 5/2013 | Liu | ...................... | F04D 29/056 416/174 |
| 2013/0200742 A1* | 8/2013 | Seki | ........................ | H02K 3/28 310/195 |
| 2013/0249327 A1* | 9/2013 | Gianni | ................... | H02K 1/148 310/43 |

* cited by examiner

ELECTRIC MOTOR HAVING REINFORCING RING

CROSS REFERENCE TO RELATED APPLICATIONS

This non-provisional patent application claims priority under 35 U.S.C. § 119(a) from Patent Application No. 201510054879.2 filed in The People's Republic of China on Jan. 30, 2015, and from Patent Application No. 201510738046.8 filed in The People's Republic of China on Nov. 3, 2015, the entire contents of both are hereby incorporated by reference.

FIELD OF THE INVENTION

This invention relates to an electric motor and in particular, to a stator of an electric motor.

BACKGROUND OF THE INVENTION

Electric motors are a common source of mechanical power, being used in a wide variety of applications and devices, such as electric fans, washing machines, water pumps etc. Generally, a motor is composed of two parts, namely a rotor and a stator. A one type of motor, the stator is composed of a magnetic core with windings wound around the magnetic core. The rotor may have a permanent magnet. When energized, the windings of the stator generate a magnetic field which interacts with a magnetic field of the rotor to rotate the rotor and in turn drive a load.

The magnetic core of a known wound stator is generally formed by stacking a large number of silicon steel sheets or laminations. Each silicon steel sheet is formed by directly punching a thin sheet material. Each silicon steel sheet comprises an annular yoke, and teeth radiating from the yoke part. For a stator used in an outer rotor motor, the teeth radiate outwardly from the yoke. An annular supporting part is formed at a central area of the yoke. The supporting part is used to fixedly connect the stator to other components. The windings are wound around the teeth. Although the manufacturing procedure of the stator core of the existing stator is simple, the punching process use to form the stator laminations generates a large amount of waste material, resulting in a high cost.

SUMMARY OF THE INVENTION

Hence there is a desire for a stator of an electric motor having high material utilization and light weight.

Accordingly, in one aspect thereof, the present invention provides a motor comprising: a stator, a rotor, and a support seat, the support seat has a hollow sleeve arranged to support the rotor; the stator comprises a stator structure and a stator winding wound about the stator structure, the stator structure comprises: a core of magnetic material, the core having an annular yoke and a plurality of teeth that extend radially outwardly from the yoke; a winding frame being a molded structure comprising an insulation part that covers the core, a supporting part that is disposed within the core and forming a connection with the sleeve of the support seat to fix the stator structure to the support seat, a plurality of ribs that connect the insulation part to the supporting part, and a reinforcing ring embedded in the supporting part, wherein the strength of the reinforcing ring is higher than the strength of the supporting part.

Preferably, the ribs are circumferentially spaced.

Preferably, the reinforcing ring is a metal ring.

Preferably, the reinforcing ring comprises an annular body and a plurality of support legs extending axially outwardly from an outer edge of the body, and a distal end of each support leg forms a barb.

Preferably, an outer edge of the reinforcing ring has a ripple shape.

Preferably, a positioning projection and/or recess is formed at an inner edge of the reinforcing ring.

Preferably, the support part has a cylinder configured to receive the sleeve to form the connection with the sleeve.

Preferably, a projection is formed on one of an inner wall surface of the cylinder and an outer wall surface of the sleeve, and a recess engaging with the projection is formed in the other one, thereby positioning the stator structure circumferentially with respect to the support seat.

Preferably, the supporting part is cylindrical, an inner surface of the supporting part protrudes inwardly to form an annular flange, the reinforcing ring is disposed on the annular flange, and an outer edge of the reinforcing ring is embedded in the supporting part.

Preferably, the sleeve and the reinforcing ring are fixed together by plastic deformation of a free end of the sleeve.

Preferably, the winding frame is a single monolithic part directly molded over the core.

Alternatively, the winding frame comprises an upper winding frame and a lower winding frame, through holes are formed in one of the upper winding frame and the lower winding frame, posts are formed in the other one, and the posts are inserted into the through holes to connect the upper winding frame with the lower winding frame.

Preferably, each tooth comprises a winding portion connected with the yoke and a tip formed at a distal end of the winding portion; the winding is wound around the winding portion; a notch is formed in a connection area of the tip and the winding portion; a part of the tip is tilted outwardly before formation and is pressed to bend inwardly to be in contact with the winding portion after winding is complete, so that the notch is closed.

Preferably, the core is formed by bending a strip material, through holes are formed in the yoke of the core, and fixing pieces, such as pins or rivets, are inserted into the through holes, thereby shaping the core.

Optionally, the core is formed by bending a strip material, and the shape of the core is maintained by welding the teeth.

Compared with the prior art, the winding frame of the stator structure of the motor provided by the present invention has the advantages that the supporting part is integrally formed inside the stator core and a reinforcing ring is embedded in the supporting part, thereby not only improving the material utilization, but also reducing the weight of the stator structure while ensuring the strength of the interface between the stator core and the support seat.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
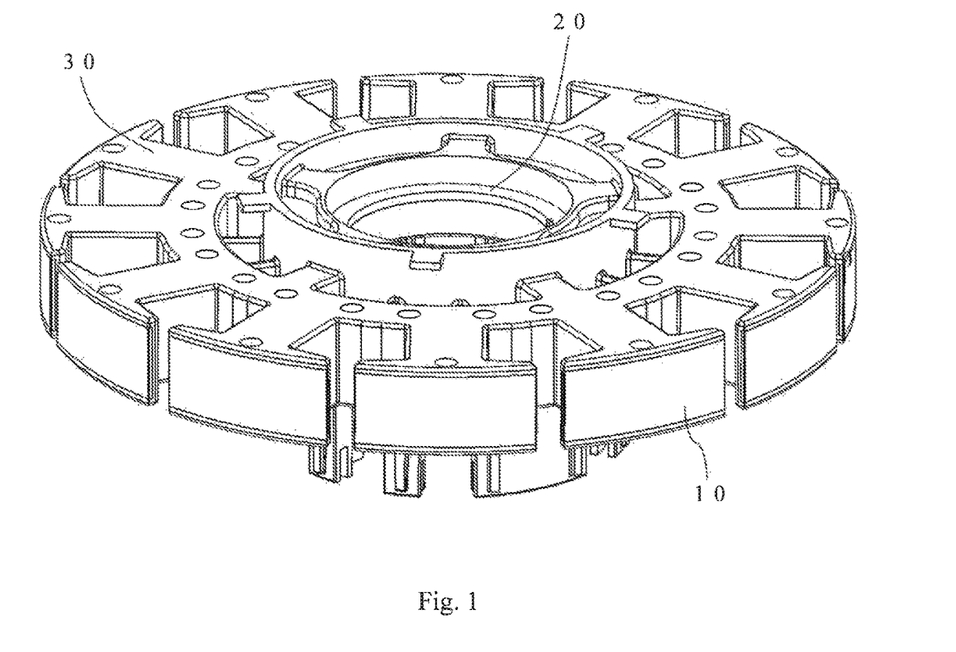
FIG. 1 illustrates a stator structure of a motor according to a preferred embodiment of the present invention.
Figure 2:
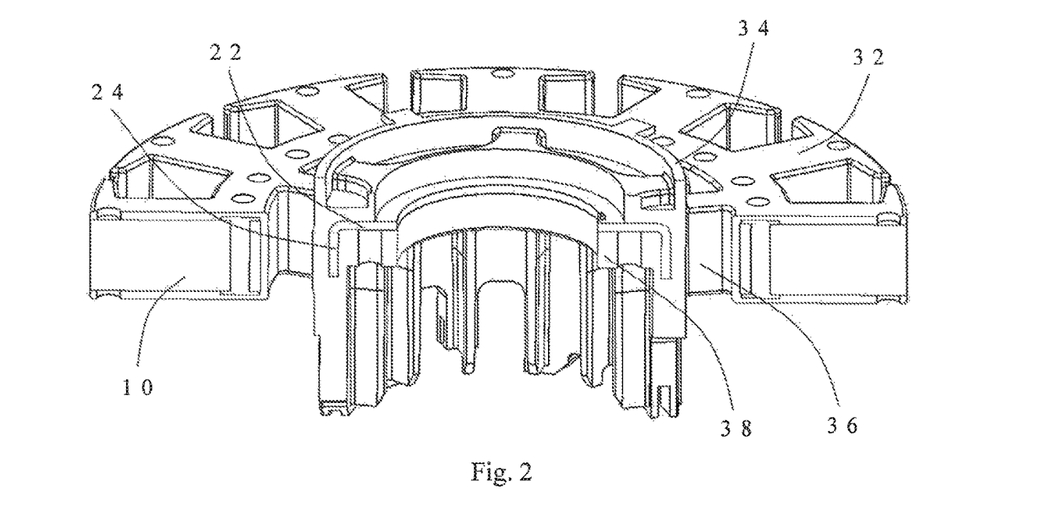
FIG. 2 is a sectional view of the stator structure of FIG. 1.
Figure 3:
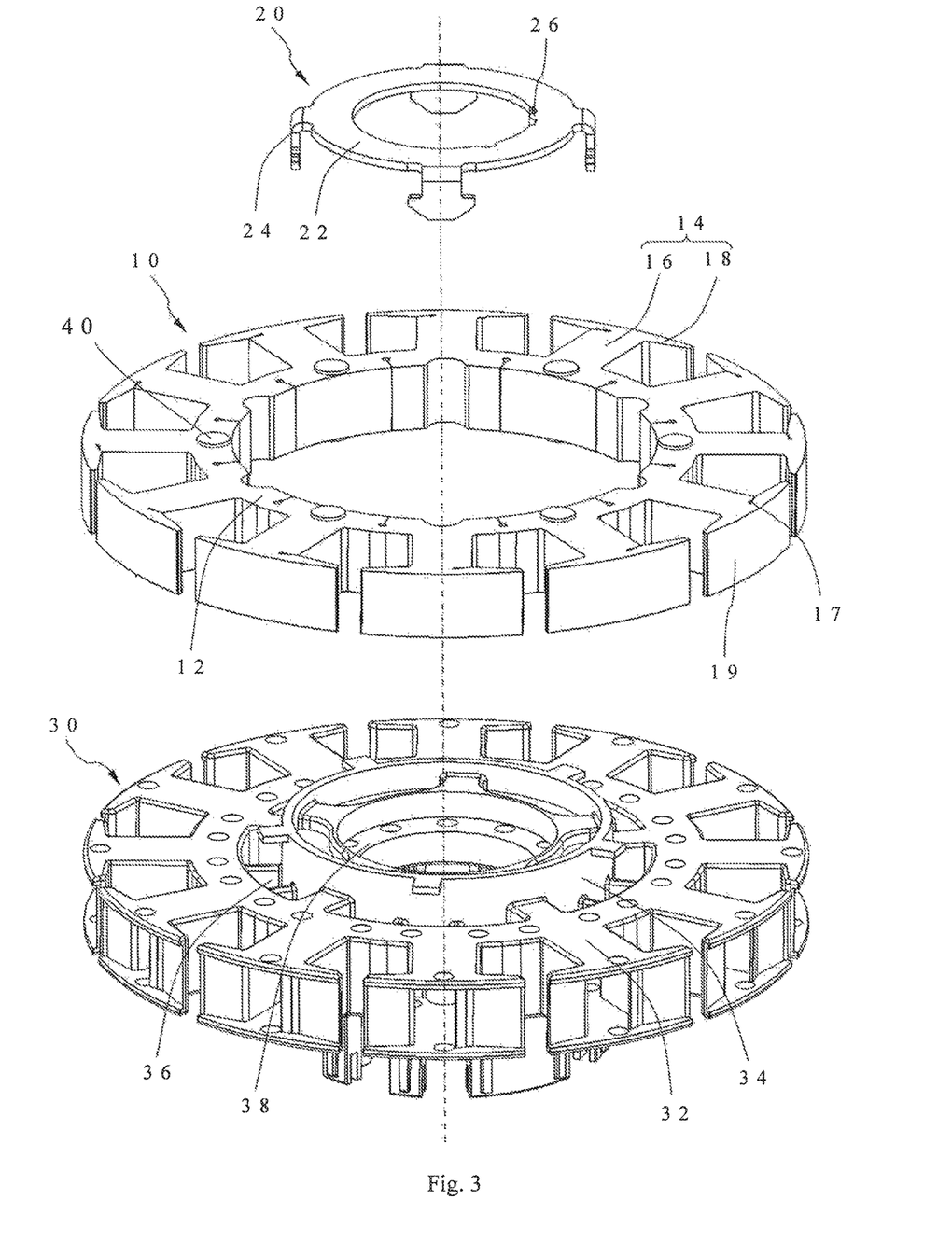
FIG. 3 is an exploded view of the stator structure of FIG. 1.

FIG. 1 through FIG. 3 show a stator structure of a motor according to one embodiment of the present invention. The stator structure is a major component of the stator of the motor. The stator structure comprises an annular stator core 10 made of a soft magnetic material, a reinforcement member, such as a reinforcing ring 20, disposed inwardly of the core, and a winding frame 30 integrally connecting the core 10 and the reinforcing ring 20. The stator further comprises windings 31 (shown in FIG. 4) wound around the winding frame 30 of the stator structure.

In this embodiment, the core 10 is of an integrated structure formed by spirally stacking and winding a strip material and comprises an annular yoke 12 and a plurality of teeth 14 that extend radially outwardly from an outer edge of the yoke 12. The yoke 12 is of a hollow cylindrical structure formed by the spiral winding of the strip material. The teeth 14 are uniformly or non-uniformly disposed at intervals in a circumferential direction of the yoke 12. Compared with the traditional circular punching sheet structure, the spirally stacked and wound core 10 generates substantially less waste material, thereby improving the utilization rate of raw materials. In some embodiments, the strip materials can also be bent to form circular sheets, and the circular sheets are stacked to form the core 10, which likewise generates substantially less waste material. In this embodiment, a plurality of through holes are formed in the yoke 12 of the core 10 and penetrate through the yoke 12 axially, and fixing pieces, such as rivets or pins 40, penetrate through the through holes to maintain the shape of the core 10. In some embodiments, the core 10 can be shaped in other manners, such as, for example, welding the stacked teeth 14 into a whole body.

Each tooth 14 comprises a winding portion 16 connected with the yoke 12 and a tip 18 formed at the distal end of the winding portion 16. A winding slot is formed between adjacent winding portions 16, a slot opening is formed between adjacent tips 18, and the windings are wound around the winding portions 16 and disposed in the winding slots. Preferably, a notch 17 is formed in a connection area of the tip 18 and the winding portion 16. Before formation, the tip 18 is partially tilted outwardly, and the adjacent tips 18 can be partially overlapped in a length direction of the strip material before bending, so that the width of the tip 18 can be effectively increased. After the spiral winding of the strip material, the tips 18 are spread out, and a larger slot opening is formed between the adjacent tips 18, which facilitates winding. After winding is completed, the tilted part of the tip 18 is pressed to generate plastic deformation to bend inwardly to be in tight contact with the winding portion 16, so that the original notch 17 is narrowed to be in a line shape, and a small slot opening is formed between the adjacent tips 18. In this embodiment, the notch 17 is only formed in a connection area of the tip and a single side of the winding portion. Of course, in other embodiments, the notch 17 can be formed in connection areas of the tip 18 and both sides of the winding portion.

The reinforcing ring 20 and the core 10 are coaxially arranged, and the reinforcing ring 20 is disposed within the yoke 12 of the core 10. The reinforcing ring 20 comprises an annular body 22 and a plurality of support legs 24 extending from the body 22. The outer diameter of the body 22 is much less than the inner diameter of the yoke 12, and the support legs 24 extend axially downwards from an outer edge of the body 22. In this embodiment, the multiple support legs 24 are uniformly arranged on the body 22 circumferentially at intervals (can be non-uniformly arranged at intervals in other embodiments), and a distal end of each support leg 24 forms a barb. An inner edge of the body 22 is protruded radially inwardly to form a projection 26 for assembly and positioning of the stator structure.

The winding frame 30 is an integrated structure overmolded from an insulation material, such as plastic or the like. In formation, the core 10 and the reinforcing ring 20 are disposed in a mold, and the plastic is injected to form the winding frame 30 which simultaneously covers the core 10 and the reinforcing ring 20 to integrally connect the core 10 with the reinforcing ring 20. The winding frame 30 comprises an insulation part 32 corresponding to the core 10, a supporting part 34 corresponding to the reinforcing ring 20 and a plurality of ribs 36 connected between the insulation part 32 and the supporting part 34.

The insulation part 32 and the core 10 are matched in profile. As shown in FIG. 1 and FIG. 2, the insulation part 32 covers all outer surfaces of the core 10, except for an outer circumferential surface of the tip 18, thereby ensuring insulation between the windings and the core 10 when the windings are subsequently wound around the core 10, and hence avoiding short circuit of the windings. The supporting part 34 is cylinder-shaped and covers the reinforcing ring 20 to form a supporting mechanism with the reinforcing ring 20. The supporting mechanism is used to fixedly connect the stator structure with other components of the motor, such as a support seat. In this embodiment, the inner diameter of the supporting part 34 is less than the outer diameter of the reinforcing ring 20, an inner wall surface of the supporting part 34 is protruded inwards radially to form an annular flange 38, a body 22 of the reinforcing ring 20 is stacked on the annular flange 38, and the inner diameters of the reinforcing ring and the annular flange 38 are approximately the same. The outer edge of the body 22 of the reinforcing ring 20 and the supporting legs are embedded in the insulation part 32. The ribs 36 are distributed circumferentially at intervals, each rib 36 is in a shape of a thin sheet and is connected between the outer wall of the supporting part 34 and the inner wall of the insulation part 32, thereby ensuring the connection strength between the insulation part 32 and the supporting part 34 and reducing the weight of the whole winding frame 30.

Figure 4:
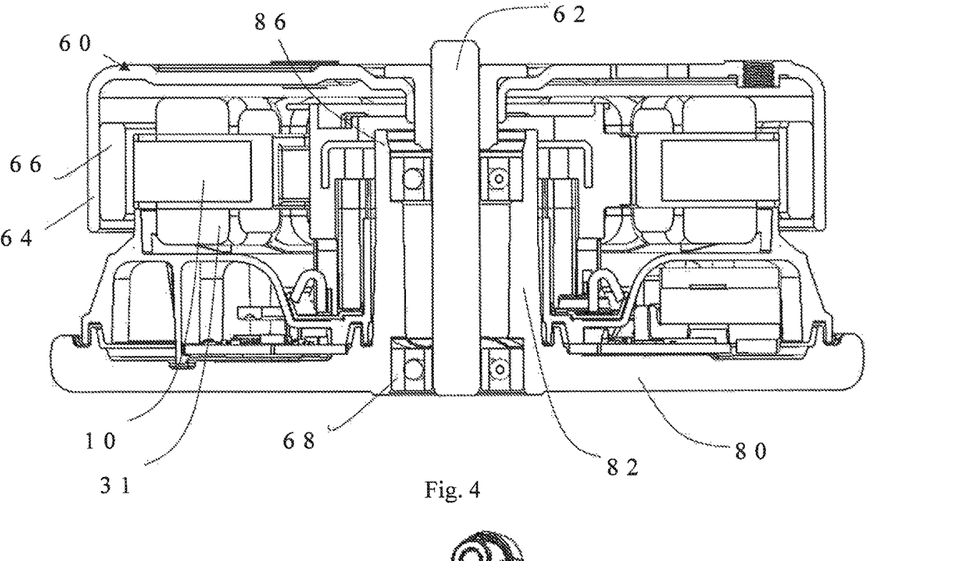
FIG. 4 is a sectional view of a motor using the stator structure of FIG. 1.
Figure 5:
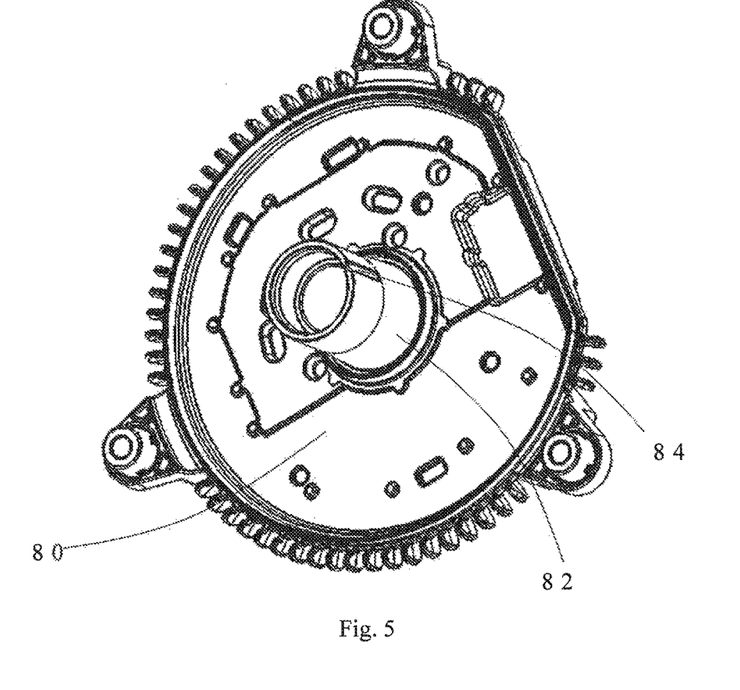
FIG. 5 illustrates a support seat of the motor of FIG. 4.
Figure 6:
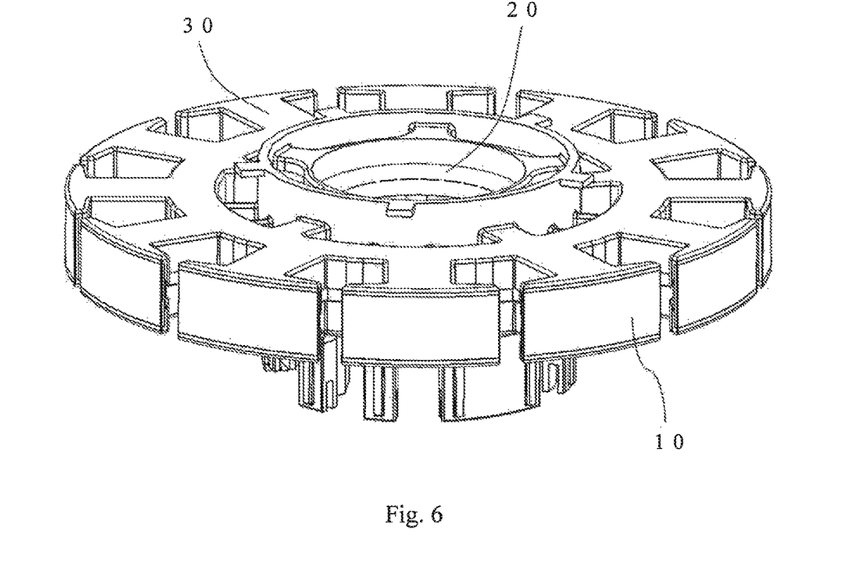
FIG. 6 illustrates a stator structure of a motor according to another embodiment of the present invention.
Figure 7:
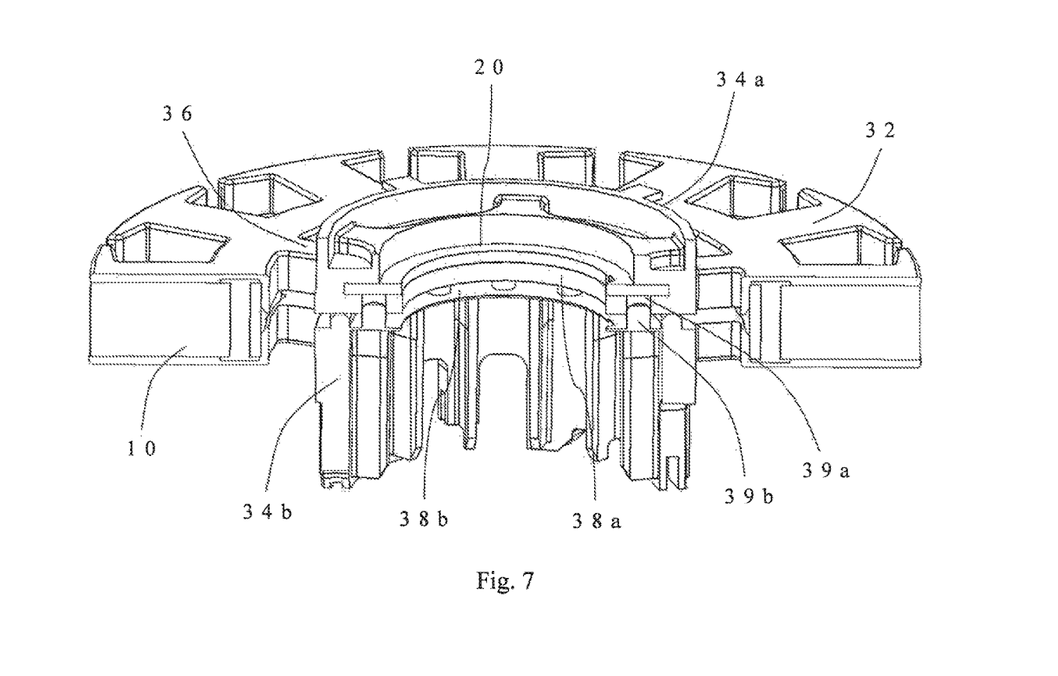
FIG. 7 is a sectional view of the stator structure of FIG. 6.

FIG. 4 is a sectional view of a motor incorporating the stator structure of FIG. 1. FIG. 5 is a view of a support seat 80 of the motor of FIG. 4 The motor comprises a rotor 60 and the support seat 80. The rotor 60 comprises a shaft 62, a shell 64 fixed to the shaft 62, and a permanent magnet 66 mounted on an inner surface of a sidewall of the shell 64. The permanent magnet 66 opposes the outer surfaces of the teeth 14 of the core 10 of the stator, with an air gap formed there between. The permanent magnet provides a magnetic field for the rotor and may comprise one or more separate permanent magnet pieces. A center of the support seat 80 protrudes axially upwardly to form a hollow sleeve 82, and the hollow sleeve 82 is used to mount a bearing or the like for supporting the rotor 60. In this embodiment two bearings 68 support the rotor. An outer wall surface of a top of the sleeve 82 has an axially extending recess 84, for engaging with the projection 26 of the reinforcement ring to position the stator structure circumferentially. The positions of the projection 26 and the recess 84 can be interchanged. In this embodiment, the support seat 80 is manufactured from a metal material, such as aluminum. Preferably, after the stator structure is mounted on the sleeve 82, a free end 86 of the sleeve 82 is plastically deformed outwardly to engage with the reinforcing ring 20 to fix the stator structure to the support seat 80.

Figure 8:
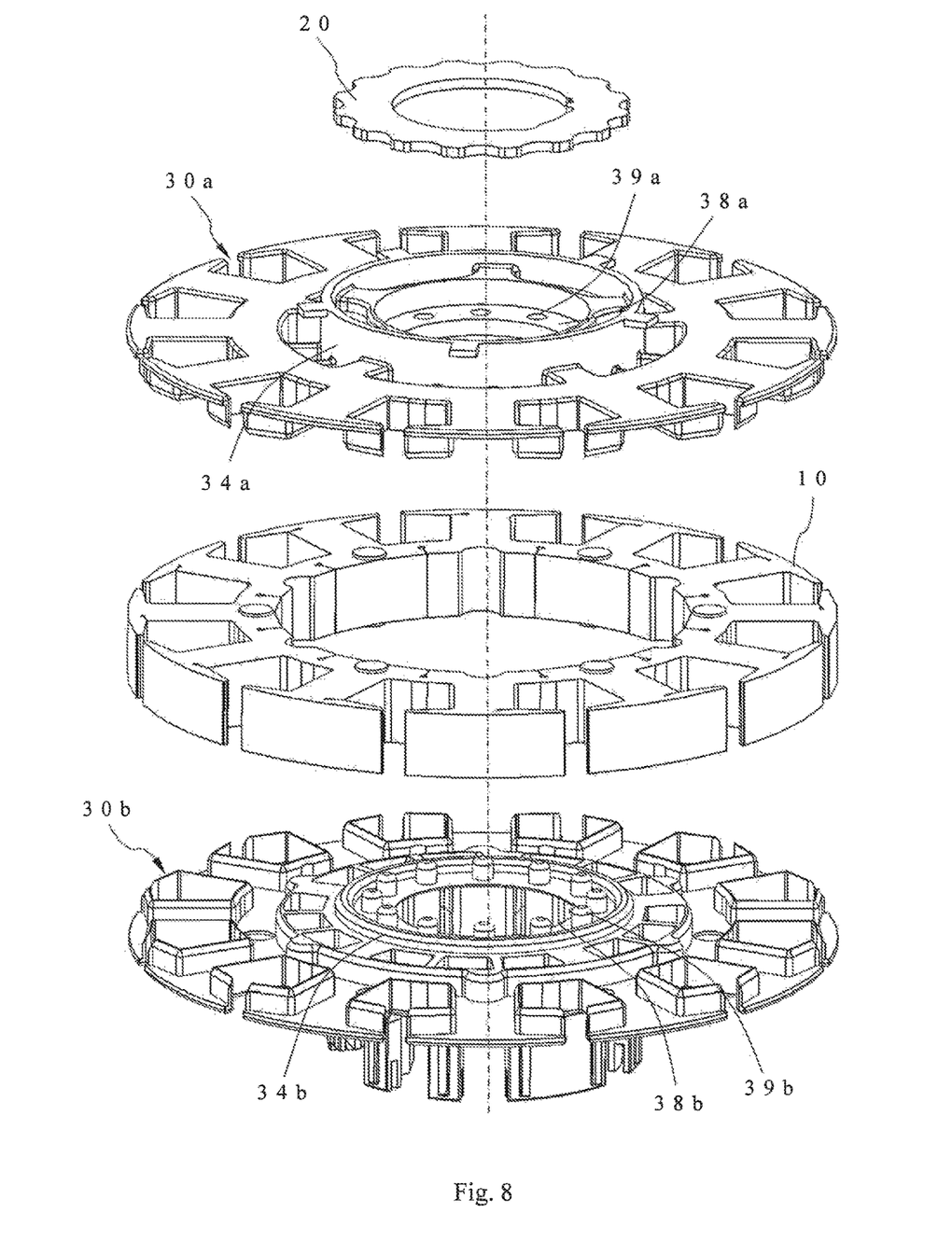
FIG. 8 is an exploded view of the stator structure of FIG. 6.
Figure 9:
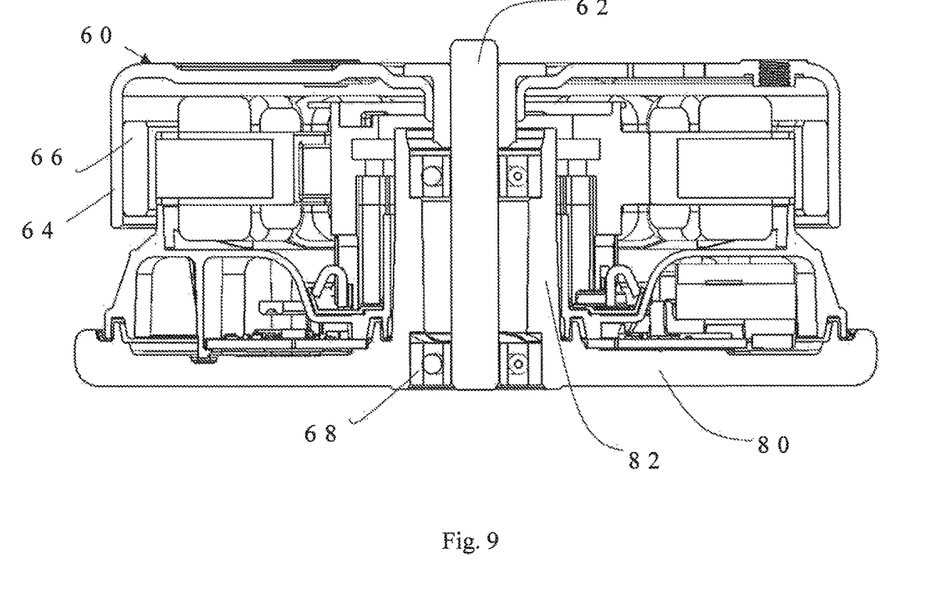
FIG. 9 is a sectional view of a motor using the stator structure of FIG. 6

FIG. 6 through FIG. 9 show another embodiment of a motor with a stator provided in accordance with the present invention. The main differences between the two embodiments lie in the winding frame 30 and the reinforcing ring 20. In this embodiment, the winding frame 30 comprises an upper winding frame 30a and a lower winding frame 30b. The upper winding frame 30a and the lower winding frame 30b are respectively integrally formed by injection molding or the like, and then are assembled around the core 10 to form the winding frame 30. The reinforcing ring 20 is embedded in a supporting part 34a/34b of one of the upper winding frame 30a and the lower winding frame 30b so as to reinforce the strength of the supporting part 34 of the winding frame 30. In this embodiment, the reinforcing ring 20 is embedded in the upper winding frame 30a, preferably by insert molding. Preferably, the reinforcing ring has an outer edge that is irregular to increase the connection strength against twisting between the reinforcing ring and the supporting part. Optionally, the outer edge is ripple-shaped as shown in FIG. 8. It should be understood that in the present invention, the reinforcing ring 20 cooperates with the plastic winding frame 30 to form a supporting mechanism. By taking advantages of the high strength of the metal and lightweight of the plastic, the overall weight is reduced while the strength of the supporting mechanism is ensured.

An inner surface of the supporting part 34a of the upper winding frame 30a is protruded inwards to form an annular flange 38a. The reinforcing ring 20 is located on the annular flange 38a and is partially exposed, and the outer edge of the reinforcing ring 20 extends into the supporting part 34a and is covered by the upper winding frame 30a. Preferably, multiple through holes 39a are formed in the annular flange 38a of the upper winding frame 30a, which are uniformly distributed circumferentially at intervals and axially penetrate through the annular flange 38a. An inner surface of the supporting part 34b of the lower winding frame 30b is protruded inwards to form an annular flange 38b. Multiple posts 39b are formed on the annular flange 38b, and each post 39b is inserted into the corresponding through hole 39a to connect the lower winding frame 30b with the upper winding frame 30a to form a whole body. In other embodiments, the posts 39b can also be formed on the upper winding frame 30a, and the through holes 39a are formed in the lower winding frame 30b; similarly, by engagement of the posts 39b into the through holes 39a, the upper winding frame 30a and the lower winding frame 30b are connected to form the winding frame 30, and the supporting part 34a and the supporting part 34b cooperatively form a plastic supporting part 34 in the core 10, which cooperates with the reinforcing ring 20 to ensure the strength of the stator structure and lighten the stator structure.

In the stator structure, the core 10 is formed by bending or winding the strip material, which enhances the material utilization rate and bending the tips to reduce the width of the slot opening reduces the cogging torque, thus improving the operating stability of the motor by reducing vibration. In addition, by forming the integrated winding frame 30 with the overmolding process, the integrated winding frame 30 integrally forms the supporting part 34 within the core 10, which can not only save material, but also reduces the overall weight of the motor when compared with the practice that the core extends inwardly to form the supporting part. Furthermore, the reinforcing ring 20 is arranged in the supporting part 34, so that the supporting mechanism has enough strength to make it not easy to deform or damage under stress.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A motor comprising: a stator, a rotor, and a support seat, the support seat has a hollow sleeve arranged to support the rotor;
the stator comprises a stator structure and a stator winding wound about the stator structure,
the stator structure comprises:
a core of magnetic material, the core having an annular yoke and a plurality of teeth that extend radially outwardly from the yoke;
a winding frame being a molded structure comprising an insulation part that covers the core, a supporting part that is disposed within the core and forming a connection with the sleeve of the support seat to fix the stator structure to the support seat, a plurality of ribs that connect the insulation part to the supporting part, and a reinforcing ring embedded in the supporting part,
wherein a strength of the reinforcing ring is higher than a strength of the supporting part;
the supporting part is cylindrical, an inner surface of the supporting part protrudes inwardly to form an annular flange, the reinforcing ring is disposed on the annular flange, and an outer edge of the reinforcing ring is embedded in the supporting part.

2. The motor of claim 1, wherein the ribs are circumferentially spaced.

3. The motor of claim 1, wherein the reinforcing ring is a metal ring.

4. The motor of claim 1, wherein the reinforcing ring comprises an annular body and a plurality of support legs extending axially outwardly from an outer edge of the body, and a distal end of each support leg forms a barb.

5. The motor of claim 1, wherein an outer edge of the reinforcing ring has a ripple shape.

6. The motor of claim 1, wherein a positioning projection and/or recess is formed at an inner edge of the reinforcing ring.

7. The motor of claim 1, wherein the support part has a cylinder configured to receive the sleeve to form the connection with the sleeve.

8. The motor of claim 7, wherein a projection is formed on one of an inner wall surface of the cylinder and an outer wall surface of the sleeve, and a recess engaging with the projection is formed in the other one, thereby positioning the stator structure circumferentially with respect to the support seat.

9. The motor of claim 1, wherein the sleeve and the reinforcing ring are fixed together by plastic deformation of a free end of the sleeve.

10. The motor of claim 1, wherein the winding frame is a single monolithic part directly molded over the core.

11. The motor of claim 1, wherein the winding frame comprises an upper winding frame and a lower winding frame, through holes are formed in one of the upper winding frame and the lower winding frame, posts are formed in the other one, and the posts are inserted into the through holes to connect the upper winding frame with the lower winding frame.

12. The motor of claim 1, wherein each tooth comprises a winding portion connected with the yoke and a tip formed at a distal end of the winding portion; the winding is wound around the winding portion; a notch is formed in a connection area of the tip and the winding portion; a part of the tip is tilted outwardly before formation and is pressed to bend inwardly to be in contact with the winding portion after winding is complete, so that the notch is closed.

13. The motor of claim 1, wherein the core is formed by bending a strip material, through holes are formed in the yoke of the core, and fixing pieces are inserted into the through holes, thereby shaping the core.

14. The motor of claim 1, wherein the core is formed by bending a strip material, and the shape of the core is maintained by welding the teeth.

15. A motor comprising: a stator, a rotor, and a support seat, the support seat has a hollow sleeve arranged to support the rotor;
the stator comprises a stator structure and a stator winding wound about the stator structure,
the stator structure comprises:
a core of magnetic material, the core having an annular yoke and a plurality of teeth that extend radially outwardly from the yoke;
a winding frame being a molded structure comprising an insulation part that covers the core, a supporting part that is disposed within the core and forming a connection with the sleeve of the support seat to fix the stator structure to the support seat, a plurality of ribs that connect the insulation part to the supporting part, and a reinforcing ring embedded in the supporting part,
wherein a strength of the reinforcing ring is higher than a strength of the supporting part, an outer edge of the reinforcing ring has a ripple shape.

16. A motor comprising: a stator, a rotor, and a support seat,
the support seat has a hollow sleeve arranged to support the rotor;
the stator comprises a stator structure and a stator winding wound about the stator structure,
the stator structure comprises:
a core of magnetic material, the core having an annular yoke and a plurality of teeth that extend radially outwardly from the yoke;
a winding frame being a molded structure comprising an insulation part that covers the core, a supporting part that is disposed within the core and forming a connection with the sleeve of the support seat to fix the stator structure to the support seat, a plurality of ribs that connect the insulation part to the supporting part, and a reinforcing ring embedded in the supporting part,
wherein a strength of the reinforcing ring is higher than a strength of the supporting part, the sleeve and the reinforcing ring are fixed together by plastic deformation of a free end of the sleeve.

* * * * *